(12) United States Patent
Atsatt

(10) Patent No.: US 7,954,096 B2
(45) Date of Patent: May 31, 2011

(54) SHARED LOADER SYSTEM AND METHOD

(75) Inventor: Bryan Atsatt, Half Moon Bay, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1265 days.

(21) Appl. No.: 11/225,143

(22) Filed: Sep. 12, 2005

(65) Prior Publication Data

US 2007/0061796 A1 Mar. 15, 2007

(51) Int. Cl.
*G06F 9/44* (2006.01)
(52) U.S. Cl. .............................. 717/166; 717/148; 718/1
(58) Field of Classification Search .................. None
See application file for complete search history.

(56) References Cited

U.S. PATENT DOCUMENTS

| | | | |
|---|---|---|---|
| 5,488,711 A | 1/1996 | Hewitt et al. | |
| 6,081,807 A | 6/2000 | Story et al. | |
| 6,321,323 B1 | 11/2001 | Nugroho et al. | |
| 6,442,565 B1 | 8/2002 | Tyra et al. | |
| 6,718,364 B2 | 4/2004 | Connelly et al. | |
| 6,738,977 B1* | 5/2004 | Berry et al. | 719/332 |
| 6,748,396 B2 | 6/2004 | Kilcnik | |
| 6,915,511 B2* | 7/2005 | Susarla et al. | 717/166 |
| 6,973,646 B1 | 12/2005 | Bordawekar et al. | |
| 7,035,870 B2* | 4/2006 | McGuire et al. | 707/103 R |
| 7,039,923 B2 | 5/2006 | Kumar et al. | |
| 7,069,550 B2* | 6/2006 | Fraenkel et al. | 717/166 |
| 7,316,010 B1* | 1/2008 | Daynes et al. | 717/140 |
| 7,398,523 B2 | 7/2008 | Martin et al. | |
| 7,516,331 B2 | 4/2009 | Jin et al. | |
| 7,644,403 B2 | 1/2010 | Atsatt | |
| 7,784,043 B2 | 8/2010 | Atsatt | |
| 2003/0121031 A1 | 6/2003 | Fraenkel et al. | |
| 2005/0021487 A1 | 1/2005 | Verma et al. | |
| 2005/0027757 A1 | 2/2005 | Kiessig et al. | |
| 2005/0028152 A1 | 2/2005 | Hays et al. | |
| 2005/0060698 A1* | 3/2005 | Boykin et al. | 717/166 |
| 2005/0154785 A1 | 7/2005 | Reed et al. | |
| 2006/0070051 A1* | 3/2006 | Kuck et al. | 717/162 |
| 2006/0143622 A1 | 6/2006 | Prabandham et al. | |
| 2006/0206903 A1 | 9/2006 | Lawrence et al. | |
| 2006/0248140 A1* | 11/2006 | Birenheide | 709/203 |

(Continued)

OTHER PUBLICATIONS

Jens Krause and Bernhard Plattner, "Safe Class Sharing among Java Processes," Research Report, Apr. 24, 2000, http://www.zurich.ibm.com/pdf/rz3230.pdf, pp. 1-14.*

(Continued)

*Primary Examiner* — Michael J Yigdall
(74) *Attorney, Agent, or Firm* — Kilpatrick Townsend & Stockton LLP

(57) ABSTRACT

A virtual machine method and system that includes shared loader importation and selective searching. For example, shared loader is stored for importation into a loader tree by executing a shared loader process. In one exemplary implementation, a shared loader search includes determining if a class is in the cache. If not in the cache, a determination is made if the class is in the parent. If the class is not in the parent, previously imported shared loaders of the child are searched. Finally, if the class is not in the shared loaders a determination is made if the class is in a local code source. In one exemplary implementation, an annotated class not found exception is produced if the class is not in a local code source. Shared loaders are selectively imported.

16 Claims, 4 Drawing Sheets

U.S. PATENT DOCUMENTS

2007/0006203 A1     1/2007   Marwinski
2010/0070960 A1     3/2010   Atsatt

OTHER PUBLICATIONS

OSGI Alliance; "OSGI Service Platform Core Specification;" Aug. 2005, pp. 1-276.

Hovenmeyer, David and Pough, William, "More Efficient Network Class Loading through Building," Proceedings of the 2001 Symposium on Java TM Virtual Machine Research Technology Symposium-vol. 1, 2001, 13 pages.

"About the OSGI Service Platform," Technical Whitepaper, Revision 3.0, Jun. 12, 2004, OSGI Alliance, pp. 1-17.

Atsatt, Bryan, et al., "Classloading in Oracle9iAS Containers for J2EE", Jan. 2003, Oracle Corp., retrieved online at http://oracle.com/technology/tech/java/oc4j/pdf/ClassLoadingInOC4J_WP.pdf, an Oracle White Paper, 24 pages.

Hall, Richard S. "A Policy-Driven Class Loader to Supprt Deployment in Extensible Frameworks", May 3, 2004, Springer Berlin / Heidelberg, Lecture Notes in Computer Science: Component Development, vol. 3083/2004, pp. 81-96.

"JAR File Specification", Sun Microsystems, retrieved online at http://web.archive.org/web/20000815091814/http://java.sun.com/j2se/1.3/docs/guide/jar/jar.html, 11 pages.

U.S. Appl. No. 11/225,535, filed Sep. 12, 2005, Office Action mailed Jun. 23, 2009, 9 pages.

U.S. Appl. No. 11/225,535, filed Sep. 12, 2005, Final Office Action mailed Dec. 28, 2009, 19 pages.

U.S. Appl. No. 11/225,535, filed Sep. 12, 2005, Advisory Action mailed Mar. 12, 2010, 3 pages.

U.S. Appl. No. 11/224,853, filed Sep. 12, 2005, Office Action mailed Oct. 1, 2009, 16 pages.

U.S. Appl. No. 11/224,853, filed Sep. 12, 2005, Final Office Action mailed Mar. 30, 2010, 13 pages.

U.S. Appl. No. 11/225,144, filed Sep. 12, 2005, Office Action mailed Jun. 19, 2009, 13 pages.

U.S. Appl. No. 11/225,144, filed Sep. 12, 2005, Final Office Action mailed Jan. 20, 2010, 13 pages.

U.S. Appl. No. 11/225,144, filed Sep. 12, 2005, Advisory Action mailed Apr. 5, 2010, 3 pages.

U.S. Appl. No. 11/224,853, filed Sep. 12, 2005, Notice of Allowance mailed Jun. 11, 2010, 7 pages.

U.S. Appl. No. 11/224,893, filed Sep. 12, 2005, Notice of Allowance mailed Aug. 20, 2009, 12 pages.

U.S. Appl. No. 11/225,535, filed Sep. 12, 2005, Notice of Allowance mailed Jun. 3, 2010, 9 pages.

* cited by examiner

SHARED LOADER SYSTEM AND METHOD

BACKGROUND

1. Field of the Invention

The present invention relates to the field of data processing. More specifically, embodiments of the present invention relate to a Java loading system and method.

2. Related Art

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. These advantageous results are often realized by computer systems implementing a virtual machine such as a Java virtual machine (JVM). A Java virtual machine is a process that runs on a host system executing binaries associated with class files. The JVM implements an abstraction referred to as a class loader that locates bytes associated with a class name and produces a translated representation of a Java class instance in a memory. However, traditional Java virtual machine loading architectures can be relatively complex and involve a number of restrictive implementation requirements that often result in limited implementation flexibility and typically consume significant system resources.

Java is an object oriented language in which classes are "specifications" (expressed as a piece of program code) that define common parameters or properties of objects included in the class. The Java applications or programs include classes. Some environments (e.g., Java two enterprise edition (J2EE)) typically permit concurrent execution of separate applications, where each application can involve multiple modules with Java classes packaged in various forms. The traditional rules governing isolation between these various components generally require the use of multiple "class loaders", each of which can hold only a single version of any given class. The classes that form a given version of a technology solution (e.g. an XML parser, such as Xerces) are generally packaged and distributed in one or more "code-source" root locations from which the classloader searches for classes. Code sources are generally anything that can be asked for a class and return it. For example, codes-sources can be defined to represent physical storage of binary class files, java sources that are compiled, or classes generated on the fly. A class loader in Java normally contains one or more "code-sources" (e.g., "Jar" or "zip" files) from which to load classes. A class loader uses each code source, along with a fully qualified class name (e.g., which includes a class package name) to define a location to search for classes.

Class loaders are typically arranged in a "tree" structure, with each loader having a single parent. When a class load event occurs, a loader is selected (called the "initiating" loader), and the standard search algorithm searches up the parent chain before searching the current ("initiating") loader. The first class matching the class name is returned. When a "child" contains the same class as one of its parents, the parent's version is traditionally selected effectively "masking" the child's copy. Traditional attempts at addressing situations in which related applications (e.g., applications in the same container) require the same version of a given technology (e.g. Xerces 2.5.0) typically deploy that technology in a class loader that is a parent to all application loaders (i.e. global), thus enabling sharing of those classes. However, when two applications in the same container require different versions of the same technology (e.g. Xerces 2.5.0 or 2.6.0), the conventional solutions tend to break down (e.g., due to search order masking).

Conventional approaches to addressing situations in which two applications in the same container require different versions of the same technology typically involve removing the globally deployed classes and bundling the appropriate jars within each application, thus isolating them from other applications in the container. Another application deployed to the container that requires the same classes traditionally has to bundle its own copy, and therefore the classes are not shared. In addition, if two applications bundle and use the same technology, objects created from the classes of that technology can not typically be shared between the applications. The duplication can also be a source of complex errors. For example, if two different class loaders load the same class, there are two different class instances (each with is own separate static data) and attempts to cast an object from one to another usually produce a ClassCastException, resulting in troubleshooting situations that are hard to understand and difficult to diagnose.

Aside from the difficulty of making conventional duplication changes for addressing situations in which two applications in the same container require different versions of the same technology, the duplication can involve other detrimental results. For example, the duplication can cause significant resource consumption, often resulting in increased operation costs. Furthermore, J2EE containers are often required to provide an implementation of certain technologies (e.g. an XML parser or a JDBC driver) for use by all applications. Some containers attempt to deploy these technologies globally but applications that require different versions are typically unusable on that type of container configuration.

SUMMARY OF THE INVENTION

A method and system for providing an efficient and convenient mechanism for class loading is presented. In one embodiment of the present invention, a virtual machine includes a first shared loader, a first generic loader, and an execution engine. The first shared loader includes a first class and is imported by the first generic loader. The virtual machine can also include a second generic loader for importing the first shared loader. The first loader and the second loader have a parent-child relationship and the second loader as a child can import a set of shared loaders that differ from a set the first loader has as a parent. A polymorphic object search is initiated by the first loader or the second loader and an imported shared loader of an initiating loader are searched and shared loaders of the other loader are not searched. The virtual machine system can also include a second shared loader with a second class, wherein the distinct versions of a technology are deployed separately in the first shared loader and the second shared loader.

In one embodiment, a virtual machine method includes selective shared loader searching and importation. For example, a shared loader is stored for importation into a loader tree. A shared loader process is performed including a shared loader search. In one exemplary implementation, a shared loader search includes determining if a class is in the cache. If not in the cache, a determination is made if the class is in the parent. If the class is not in the parent, previously imported shared loaders of the child are searched. Finally, if the class is not in the shared loaders a determination is made if the class is in a local code source. In one exemplary implementation, an annotated class not found exception is produced if the class is not in a local code source. Shared loaders are selectively imported based upon the shared loader search and processing associated with classes included in imported shared loaders are executed.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
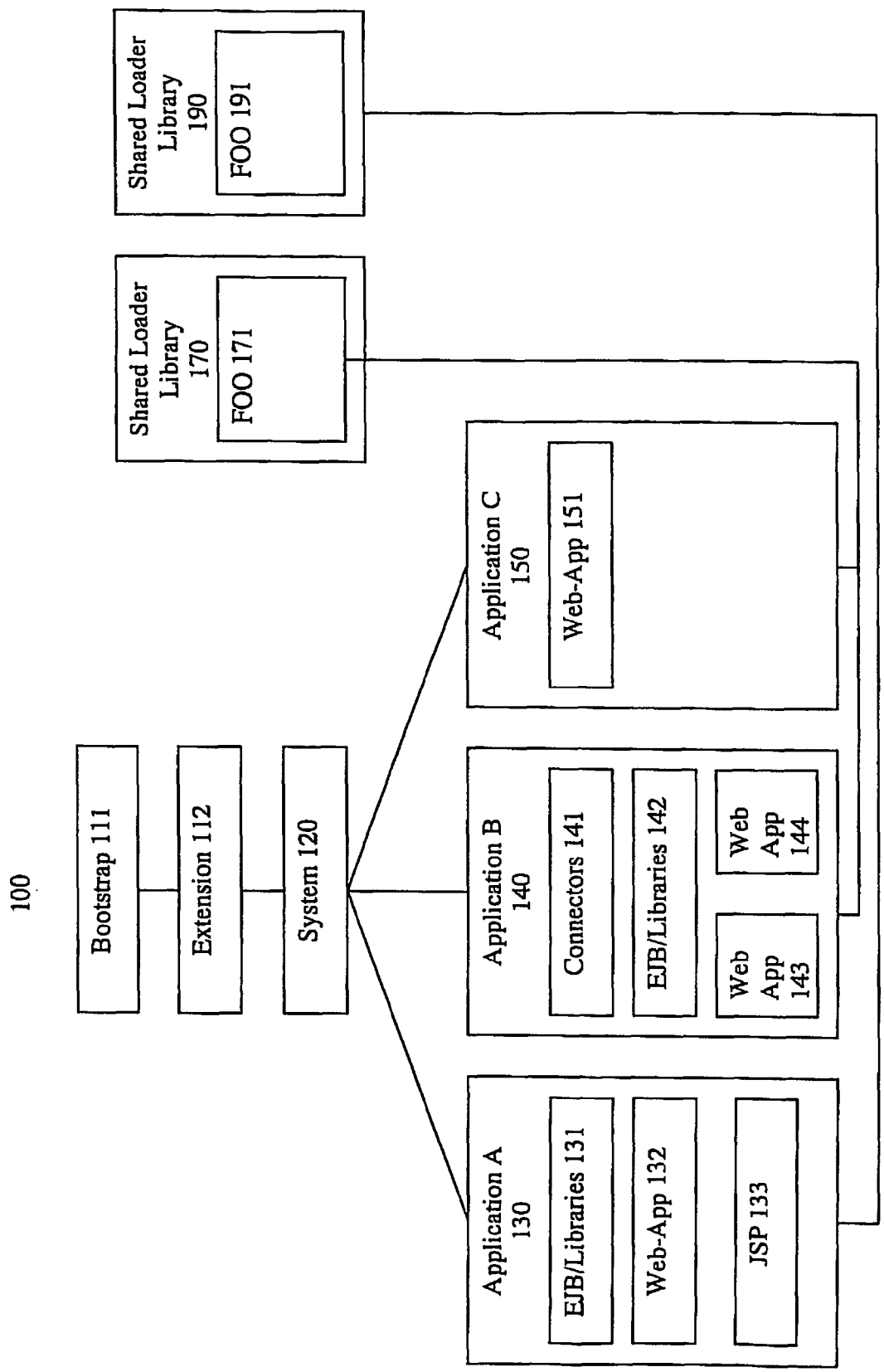
FIG. 1 is a block diagram of a virtual machine system shared loader for Java class loader tree in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

A present invention shared loader system and method allows a shared class loader (shared loader) to be referenced by multiple generic class loaders (e.g., generic loaders) outside of a traditional parent child chain and classes can be shared across traditional parent child loader boundaries. The present invention method and system provides an efficient and flexible class loader configuration. A search can be extended to a shared loader of the initiating child and an imported shared loader of a parent is not consulted during a search initiated by a child loader. The present invention also facilitates automatically importing a shared loader if a shared loader is available.

FIG. 1 is a block diagram of a virtual machine system shared loader for Java class loader tree 100 in accordance with one embodiment of the present invention. Class loader tree 100 includes variety of generic loaders and shared loaders. For example, the variety of generic loaders can include bootstrap class loader 111, extension class loader 112, system class loader 120, application A class loaders 130, application B class loaders 140, application C class loaders 150. The shared class loaders include shared loader 170 and shared loader 190. Application A class loaders 130 includes EJB/libraries class loader 131, Web-App class loader 131 and JSP class loader 132. Application B class loaders 140 includes connector class loader 141, EJB/libraries class loader 142, Web-app class loader 143 and web app class loader 144. Application C class loaders 150 include web app class loader 151. Shared loader 170 includes class FOO 171 and shared loader 190 includes class FOO 191. In one exemplary implementation FOO 171 and FOO 191 are different versions of the same class name.

The loaders of virtual machine system shared loader for Java class loader tree 100 cooperatively operate to load classes for utilization by a Java virtual machine (JVM). Bootstrap class loader 111 is a primordial loader and is responsible for loading core Java classes (e.g., rt.jar, I18.jar, etc.). In one exemplary implementation, bootstrap class loader 111 is implemented by the JVM itself. Extension class loader 112 is responsible for loading classes from the jars in the JRE's extension directory providing a mechanism to introduce new functionality beyond the core java classes. In one exemplary implementation, the default extension directory is file system path JRE/LIB/EXT. To JVM's launched from the same JRE installation any jars put in this directory are visible across processes. System class loader 120 is an application loader and is responsible for loading classes from the directories and jars listed on the command line when the JVM is invoked.

The generic loaders can import the shared loaders 170 and 190. A shared loader (e.g. shared loaders 170 and 190) of the present invention can be referenced by multiple generic loaders outside the normal parent chain permitting classes to be partitioned and shared across loader boundaries. In one embodiment of the present invention, the common notion of a jar as a library is extended to include a collection of jars and/or directories bound into a named and versioned shared loader. A generic loader (e.g., application A loaders) can import one or more shared loaders. For example, Web-app loader 132 can import shared loader 190 and permit loading of class FOO 191 and both web-app loader 143 and web-loader 151 can import shared loader 170 and permit loading of class FOO 171.

In one embodiment of the present invention, class loader tree 100 utilizes a default Java runtime environment (JRE) supplied class loader to load and launch. For example, a system loader can include all classes and their dependencies making the system loader part of the parent chain for subsequent loaders created by a shared loader compiler for Java. In one exemplary implementation, loaders created for applications A 130, B 140 and C 150 have the system loader 120 in their parent chain.

In one embodiment, present invention shared loader permits greater loader interaction flexibility in a parent child loader hierarchy. For example, some classes associated with system loaders can be moved to a shared loader (e.g., classes OC4J) and thereby selectively render internal classes and their external dependencies (e.g., XML parser/JDBC driver) no longer visible to the application class loaders. Electing options in which internal implementation classes are not visible to applications also helps minimize security risks. While visibility to some classes (e.g., internal classes) can be selectively prevented, a default configuration of the present invention can also ensure that applications that relied on the visibility of the external dependencies can still "see" them. For example, to enable dependencies on third party classes that an application still needs to have access to. Applications can also choose different versions from the default. Classes bundled at the application level that also exist at the system level can be loaded from the application. Furthermore, unlike a standard class loader search order that consults the parent loader(s) first and if any "hit" stops the search, a present invention shared loader can be utilized and versions different from the parent can be included in a shared loader.

A polymorphic object can be utilized to perform loader searches. In one embodiment of the present invention, each instance of a loader is constructed with a single search-policy which is used by default when searching that instance. Alternate search entry points can also be included in embodiments of the present invention in which a search policy can be passed in enabling flexible searching. In one embodiment of the present invention, a policy class loader type is included which uses composition to achieve flexibility. Exemplary embodiments of a policy class loader as described in patent application entitled "Method and System for Automated Root-Cause Analysis for Class Loading Failures in JAVA", U.S. patent application Ser. No. 11/224,893 filed concurrently with the present application, which is hereby incorporated by this reference.

Figure 2:
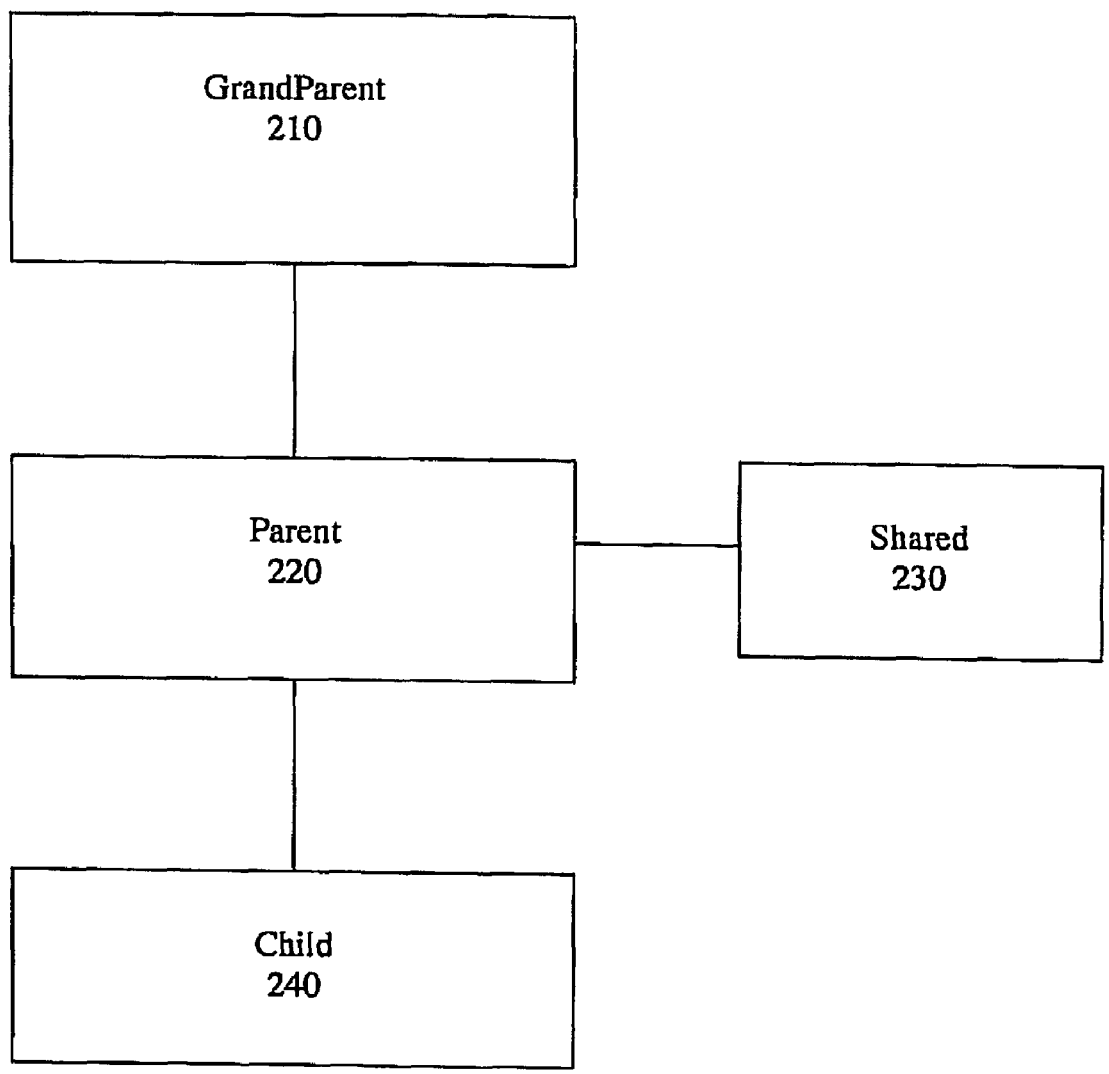
FIG. 2 is a block diagram of a generic loader tree in accordance with one embodiment of the present invention.

In one embodiment, imported loaders are not consulted during a search initiated by a child loader. FIG. 2 is a block diagram of a generic loader tree 200 in accordance with one embodiment of the present invention. A search that begins at child 240 is able to see classes in parent 220 and grandparent 210 other than shared loaders. For example, A search that begins at child 240 is not able to see classes from the imported shared loader 230. However, if the search begins at parent 220 classes from shared loader 230 are visible. If child 240 wants to be able to see classes from shared loader 230, the child 240 can also import them into a shared loader associated with child 240. This search behavior enables child loaders to selectively include shared loaders. A present invention shared loader approach also permits two or more applications to share EJBs or resource adapters without deploying them server-wide.

Figure 3:
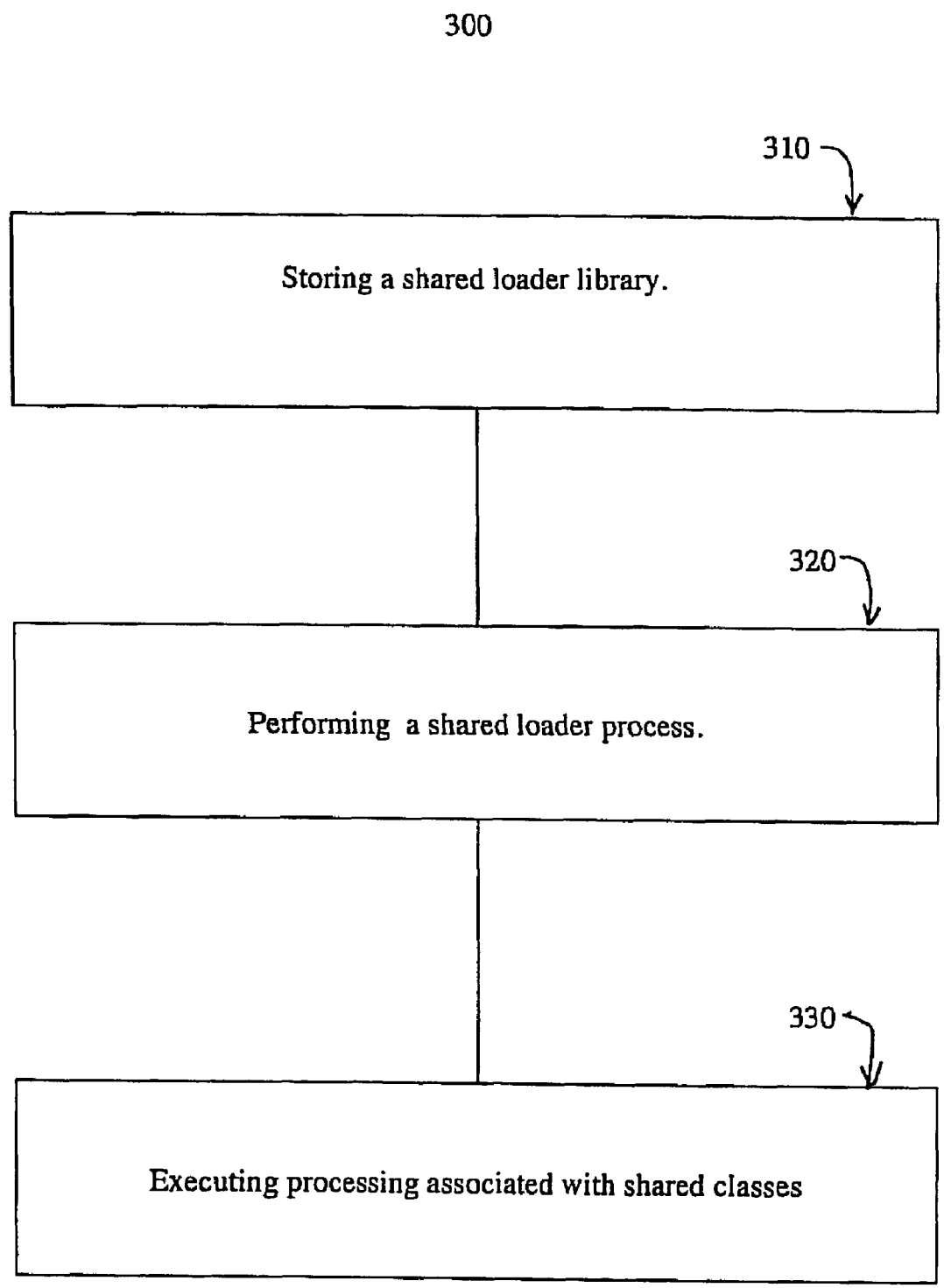
FIG. 3 is a flow chart of an exemplary virtual machine method in accordance with one embodiment of the present invention.

FIG. 3 is a flow chart of virtual machine method 300 in accordance with one embodiment of the present invention.

In step 310, a shared loader is stored. In one embodiment loaders have a name and a version number the combination of which is unique within a Java virtual machine. In one embodiment of the present invention, distinct versions of a technology are deployed in separate shared loaders, wherein each of the distinct versions of the technology have a similar basic name indication with different version indications appended (e.g., "xml.xerces", 2.5.0 and "xml.xerces" 2.7.0). Shared loaders have one or more code sources. Shared loaders can also import other shared loaders, enabling composition.

In step 320, a shared loader process is performed. In one embodiment of the present invention, a shared loader process enables a shared loader to be imported by one or more generic loaders. The classes within a shared loader can be utilized by more than one generic loader. A shared loader process also utilizes a polymorphic class loading search in which shared loaders of parents do not override shared loaders of children. In one exemplary implementation, a shared loader process permits children and parents to execute different versions of a class.

In step 330, processing associated with classes included in a shared loader is executed. In one embodiment of the present invention, applications can choose specific versions of the classes included in the shared loader. Objects created from a class in the shared loader can also be shared across applications. In addition, different versions of various technologies (e.g., an XML parser, JDBC driver, etc.) within containers can be utilized by a plurality of applications. For example, a shared loader can enable an application to choose a JDBC driver or XML parser other than those bundled in a base application. In one exemplary implementation, child applications import bundled JDBC and XML parser libraries. However, any application that needs to use a different version can used a shared loader element to import the desired or required version.

In one embodiment of the present invention, applications can specify their dependency on a shared loader by name and can optionally specify a minimum and/or maximum version number. In one exemplary implementation, available shared loaders are searched for the latest version that matches the specification, and that shared loader is then added or imported into the class loader for the application.

Figure 4:
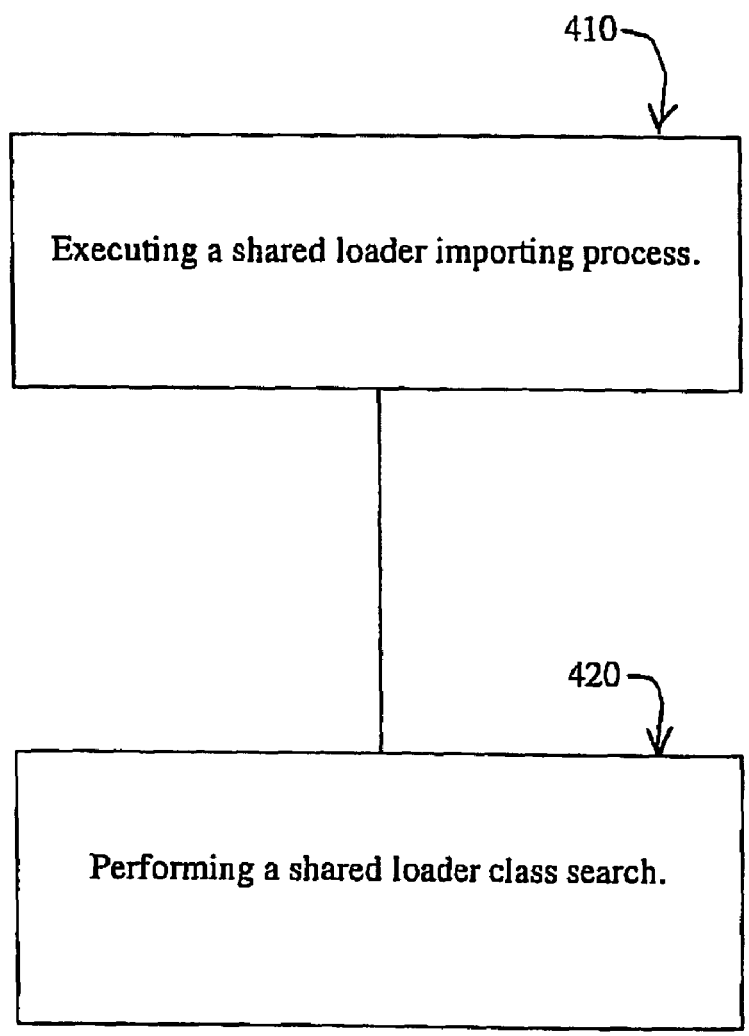
FIG. 4 is a flow chart of an exemplary virtual machine shared loaded process in accordance with one embodiment of the present invention.

FIG. 4 is a flow chart of virtual machine shared loader process 400 in accordance with one embodiment of the present invention. In one embodiment of the present invention, a search policy defines the search process. For example, a search policy can arrange for the shared loaders of the search initiating loader are searched but none of the shared loaders of the parent chain are searched. This search policy solves masking problems for classes deployed in shared loaders.

In step 410, a shared loader importing process is executed. In one embodiment, a shared loader is identified and a generic loader is configured to recognize the existence of the shared loader. In one exemplary implementation there are explicit and implicit identification configuration mechanisms. For example, there can be specific configuration mechanisms that explicitly direct a system to import a shared loader. An implicit identification and configuration mechanism can utilize extensions. For example, an extension can be a tag or name and other attributes associated with a first JAR that can be referenced in a second JAR to indicate a dependency on the first JAR. In one exemplary implementation, an extension can be included in a shared loader and the extensions can be resolved by locating the extension in the shared loader (e.g., automatically satisfy a dependency by looking in the shared loader). Deploying extensions in shared loader can satisfy recommendations that applications get access only to requested extensions. In one embodiment, a class included in an imported shared loader can be shared between a plurality of applications without duplication. A child generic loader can import a set of shared loaders that differs from the set included in its parent.

In one embodiment, code sources and shared loaders are examined for inclusion of an indicated extension. Code sources of a parent are examined, starting at the root, for a matching extension. If a matching extension is not found, imported loaders are examined. If not found in the imported loaders, other loaders within the same loader are examined. Non-imported shared loaded are checked next. When found the loader which includes the extension is automatically imported to the generic loaded that initiated or caused the extension examination. In one exemplary implementation, if the extension is still not found, an indication of the condition is logged. An exception can be thrown (e.g., to satisfy a requirement that the application be "rejected") or the behavior can be reserved for the deployment code. There can be situations in which the search fails even though an extension is present (e.g., present but not reachable). For example, an extension is deployed in a non-shared loader that is not in the parent chain of the current loader. An extension can also be masked by another extension of the same but incorrect version that takes precedence due to search order. These failure problems can be described in the logged message.

In step 420, a shared loader class search is performed. In one embodiment, a shared loader search includes determining if a class is in the cache. If not in the cache the parent is searched for the class. If the class is not in the parent, previously imported shared loaders of the child are searched. Finally, if the class is not in the shared loaders, a determination is made if the class is in a local code source. In one exemplary implementation, an annotated class not found exception is produced if the class is not in a local code source.

In one embodiment of the present invention a shared loader class search also includes determining if a class is in the cache first. However, if not included in the cache, a determination if a class is in local code sources is made next. If not in the local code sources, a previously imported shared loader of the child initiating the search is examined. If not in the previously imported shared loaders then the parent is searched. Again, an annotated class not found exception can be produced if the class is not found at the end of the shared loader search.

In one embodiment, the present invention is implemented on a computer system with a processor and a computer readable memory. The processor executes instructions associated with a virtual machine including shared loader. The computer readable medium stores instructions for causing the processor to implement a virtual machine with a shared loader. In one embodiment, the instructions include identifying a shared loader, importing a shared loader to a generic loader, and performing a shared loader class search.

In one embodiment, backward compatibility is ensured via default imports. For example, at a determined level in the parent child tree a set of loaders are declared as shared loaders and by default child loaders get the same shared loaders and through various configuration methods they can be changed. Classes can also be shared across loader boundaries and the shared loader can be referenced by multiple loaders outside a normal parent child chain. For example, classes can be partitioned and shared across parent child loader boundaries. Importing a shared loader can include creating data source instances by a global default application. The shared loader can include a plurality of JARs and/or directories bound into a named-version loader.

In one embodiment, a shared loader is declared in specified configurations. For example, a shared loader tag can include the name of the shared loader and the version of the shared loader. There can also be sub tags that indicate code sources. The indicated code source can include classes associated with the shared loader.

In one embodiment, the present invention also allows specification of additional code sources. In one exemplary implementation, various configuration files formatted in XML include XML tags. For example, the tag can take the form <classpath path; " . . . "/> where the path includes a semicolon-separated list of directories, jar or zip files in which the paths can be either relative or absolute. The tag can also take the form <library path=" . . . "/> where the path is the similar to the classpath except directories are treated specially wherein any jar or zip files contained in a directory listed in path attribute are also included and the directory search is not recursive. There are two categories of configuration files that support these tags. In a server wide category the files usually live in the "config" directory and affect all applications. For example, an application.xml file or global-application.xml file supports the <library> tag and code sources listed here are visible to a plurality of applications. Another example is the global-web-application.xml file that supports the <classpath> ag and code sources listed here are added to all web-applications, and not visible above that layer. On one exemplary implementation, even though each web application can use the same path to reference these code sources, using this tag causes class duplication since each web application has its own class loader. In an application specific category the files live alongside standard deployment descriptor files within the EAR and WAR files and extend their functionality. For example, a orion-application.xml file extends application-.xml with additional support of the <library> tag and code sources listed here are visible to a modules within an application.

Thus, the present invention method and system provides an efficient and convenient mechanism for isolating and sharing distinct versions of a technology, while avoiding costs associated with duplication. For example, duplication associated with increasing the number of technologies utilized by an application can be reduced. The present invention also facilitates elimination of sources of complex errors.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A virtual machine system comprising:
a processor; and
a memory coupled with and readable by the processor and having stored therein instructions which, when executed by the processor, cause the processor to execute a first shared loader including a first class, a first generic loader importing said first shared loader, wherein importing the first shared loader into the first generic loader comprises adding the first shared loader to the first generic loader, a second generic loader importing said first shared loader, wherein the second generic loader is not a parent or child of the first generic loader, wherein importing the first shared loader into the second generic loader comprises adding the first shared loader to the second generic loader, and wherein the first class of the first shared loader is shared between the first generic loader and the second generic loader, and an execution engine for executing said first generic loader and said first imported shared loader.

2. A virtual machine system of claim 1 wherein said first generic loader and said second generic loader each have a name and version indication which are unique within the virtual machine.

3. A virtual machine system of claim 1 further comprising a second shared loader including a second class, said first generic loader importing said second shared loader, wherein importing the second shared loader into the first generic loader comprises adding the second shared loader to the first generic loader, and wherein distinct versions of a technology are deployed separately in said first shared loader and said second shared loader in the first generic loader.

4. A virtual machine system of claim 3 wherein each of said distinct versions of said technology have the same basic name indication with different version indications appended.

5. A virtual machine system of claim 1 further comprising a third generic loader wherein said first generic loader and said third generic loader have a parent-child relationship and said third generic loader as a child can import a set of shared loaders that differs from a set said first generic loader has as a parent.

6. A virtual machine system of claim 3 wherein a polymorphic object search is performed using a search policy for the first generic loader in which said first shared loader and said second shared loader are searched if said polymorphic object search is initiated by said first generic loader and said first shared loader and said second shared loader are not searched if said polymorphic object search is not initiated by said first generic loader.

7. A virtual machine system of claim 1 wherein an application specifies a shared loader by name with a minimum and/or maximum version number.

8. A virtual machine system of claim 1 wherein said first shared loader is searched to determine if it is a latest version that matches a specification and if said first shared loader is the latest version said first shared loader is added to a class loader for an application.

9. A machine-readable medium having stored thereon a series of instructions which, when executed by a processor, cause the processor to implement a virtual machine by:
executing a first shared loader including a first class;
executing a first generic loader, wherein the first generic loader imports said first shared loader and wherein importing the first shared loader into the first generic loader comprises adding the first shared loader to the first generic loader; and
executing a second generic loader, wherein the second generic loader is not a parent or a child of the first generic loader, wherein the second generic loader imports the first shared loader, wherein importing the first shared loader into the second generic loader comprises adding the first shared loader to the second generic loader, and wherein the first class of the first shared loader is shared between the first generic loader and the second generic loader.

10. The machine-readable medium of claim 9, wherein said first generic loader and said second generic loader each have a name and version indication which are unique within the virtual machine.

11. The machine-readable medium of claim 9, further comprising executing a second shared loader including a second class, said first generic loader importing said second shared loader, wherein importing the second shared loader into the first generic loader comprises adding the second shared loader to the first generic loader, and wherein distinct versions of a technology are deployed separately in said first shared loader and said second shared loader in the first generic loader.

12. The machine-readable medium of claim 11, wherein each of said distinct versions of said technology have the same basic name indication with different version indications appended.

13. The machine-readable medium of claim 9, further comprising executing a third generic loader wherein said first generic loader and said third generic loader have a parent-child relationship and said third generic loader as a child can import a set of shared loaders that differs from a set said first generic loader has as a parent.

14. The machine-readable medium of claim 11, wherein a polymorphic object search is performed using a search policy for the first generic loader in which said first shared loader and said second shared loader are searched if said polymorphic object search is initiated by said first generic loader and said first shared loader and said second shared loader are not searched if said polymorphic object search is not initiated by said first generic loader.

15. The machine-readable medium of claim 9, wherein an application specifies a shared loader by name with a minimum and/or maximum version number.

16. The machine-readable medium of claim 9, wherein said first shared loader is searched to determine if it is a latest version that matches a specification and if said first shared loader is the latest version said first shared loader is added to a class loader for an application.

* * * * *

UNITED STATES PATENT AND TRADEMARK OFFICE
CERTIFICATE OF CORRECTION

PATENT NO.         : 7,954,096 B2                                              Page 1 of 1
APPLICATION NO.    : 11/225143
DATED              : May 31, 2011
INVENTOR(S)        : Atsatt It is certified that error appears in the above-identified patent and that said Letters Patent is hereby corrected as shown below:

Title page 2, in column 1, under "Other Publications", line 13, delete "Supprt" and insert -- Support --, therefor.

In column 1, line 35, delete "(J2EE))" and insert -- (J2EE)) --, therefor.

In column 1, line 44, delete "classloader" and insert -- class loader --, therefor.

In column 2, line 18, delete "is" and insert -- its --, therefor.

Signed and Sealed this
Eighth Day of November, 2011

David J. Kappos
*Director of the United States Patent and Trademark Office*